No. 781,171. PATENTED JAN. 31, 1905.
S. ADLER.
CARBINE HOOK.
APPLICATION FILED MAR. 28, 1903.

2 SHEETS—SHEET 1.

Witnesses:
Inventor,
Samuel Adler.

No. 781,171. PATENTED JAN. 31, 1905.
S. ADLER.
CARBINE HOOK.
APPLICATION FILED MAR. 28, 1903.
2 SHEETS—SHEET 2.
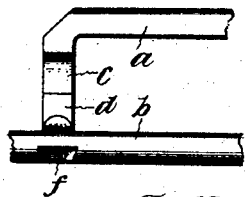
Fig.1.ᵃ
Fig.2.ᵃ
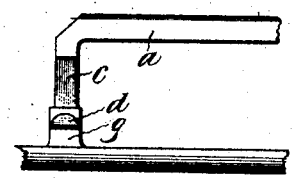
Fig.5.ᵃ
Fig.6.ᵃ
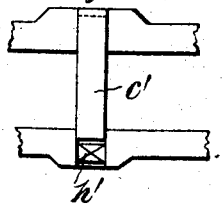
Fig.9.ᵃ    Fig.10.ᵃ
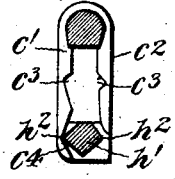
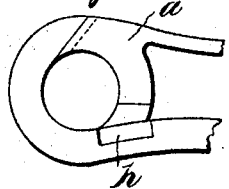
Fig.7.ᵃ
Fig.8.ᵃ
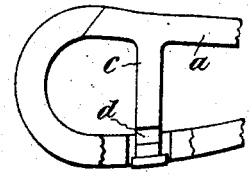
Fig.13.ᵃ
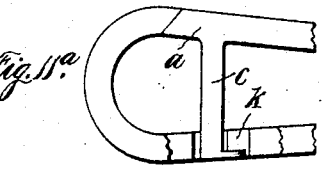
Fig.11.ᵃ
Fig.14.ᵃ    Fig.12.ᵃ
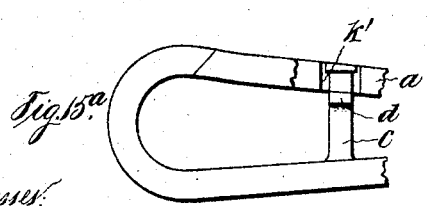
Fig.15.ᵃ
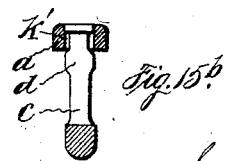
Fig.15.ᵇ
Witnesses:
B. Ober
B.H. Sommers
Inventor.
Samuel Adler.
by Henry Orthofer
Attys.

No. 781,171.

Patented January 31, 1905.

UNITED STATES PATENT OFFICE.

SAMUEL ADLER, OF VIENNA, AUSTRIA-HUNGARY.

CARBINE-HOOK.

SPECIFICATION forming part of Letters Patent No. 781,171, dated January 31, 1905.

Application filed March 28, 1903. Serial No. 150,022.

*To all whom it may concern:*

Be it known that I, SAMUEL ADLER, a subject of the Emperor of Austria-Hungary, residing at Vienna, in the Province of Lower Austria, in the Empire of Austria-Hungary, have invented certain new and useful Improvements in Carbine-Hooks or Hooks Having a Spring or Pivoted Closing-Piece; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the combination, with carbine-hooks or hooks having a tongue, of a locking device which is so arranged as to hold the spring or pivoted closing-piece thereof open when it is pressed inwardly, so that the fingers of both hands are completely free for effecting the hooking and securing while the closing and opening of the closing-piece of the hook can be effected by the pressure of a finger, whether such piece be under spring action or not. The locking member consists, mainly, of a bar applied either to the tongue or to the hook, which on being pressed inwardly is either forced sidewise or is pressed through an opening in the closing part or in the hook-stem and at the same time is made to engage the latter by means of a projection or notch, whereby the closing-piece is held in the open position and can only return to the closed position if pressure is exerted upon the said projection in the contrary direction.

In the accompanying drawings, in which like parts are similarly designated, are shown various forms of the above-described locking device for hooks as applied to double-headed links, the heads or studs of which are locked together by the carbine-hook.

Figure 1:
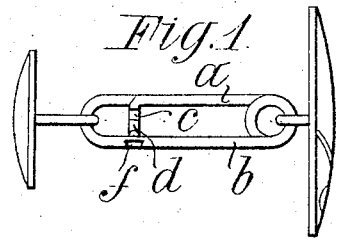
Figure 2:
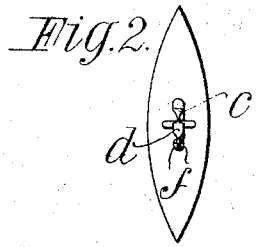
Figure 3:
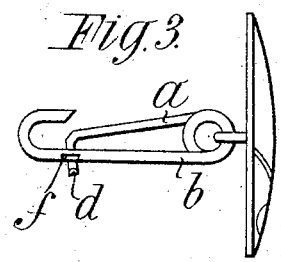
Figure 4:
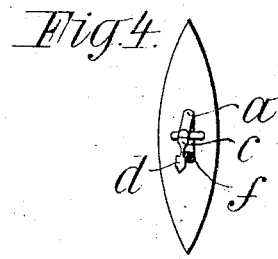
Figure 5:
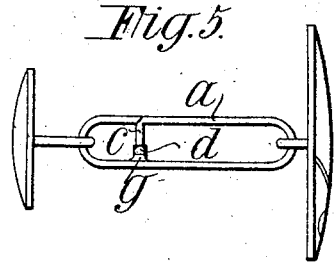
Figure 6:
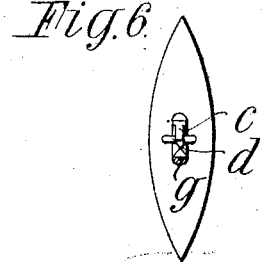
Figure 9:
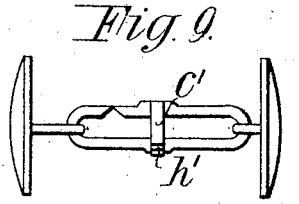
Figure 10:
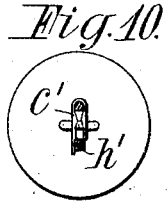
Figure 7:
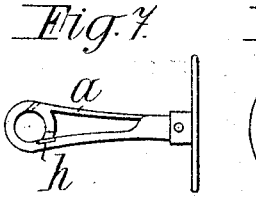
Figure 8:
Figure 13:
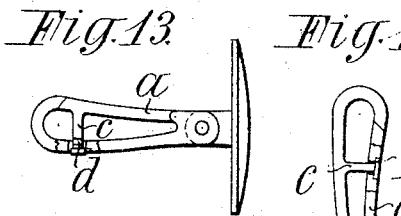
Figure 15:
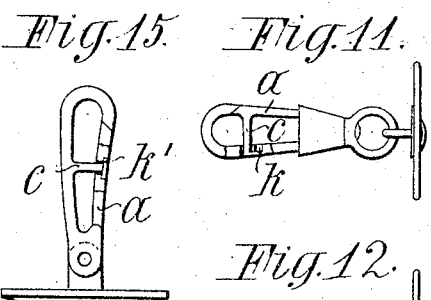
Figure 11:
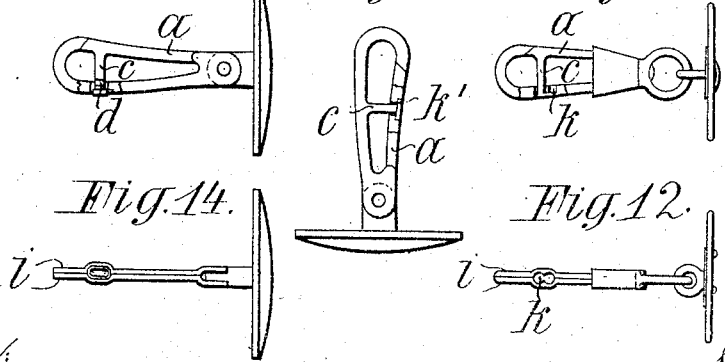
Figure 14:
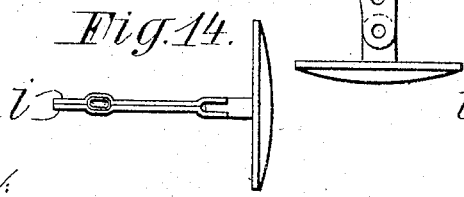
Figure 12:
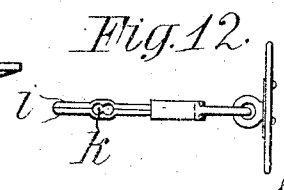

Figures 1 and $1^a$ show a hook made of a single piece of spring metal, the means to hold the hook open formed on the end of the tongue. Figs. 2 and $2^a$ are sections showing the locking member in front elevation. Figs. 3 and 4 show the hook in locked open position. Figs. 5 and $5^a$ show a modification, and Figs. 6 and $6^a$ sections showing the locking member in front elevation. Figs. 7, 8, and $8^a$ show a spring-tongue pivoted to the shank of the hook. Figs. 9 and $9^a$ show a form in which the locking member embraces the hook-shank. Figs. 10 and $10^a$ are sections showing the locking member in front elevation. Figs. 11 and $11^a$ show a hook formed of two similar parts and the locking member passing through oppositely-formed recesses in each part. Figs. 12 and $12^a$ are partial plan views showing the recesses. Figs. 13 and $13^a$ show a similar structure applied to a hook having a pivoted spring-held tongue. Figs. 14 and $14^a$ are partial plan views to show the recesses. Figs. 15 and $15^a$ show the locking member secured to the hook-shank instead of to the tongue, and Fig. $15^b$ a section showing the locking member in elevation.

In the structure shown in Figs. 1 to 4 the locking member or bar $c$, attached to the spring-tongue $a$ of the carbine-hook $b$ and formed in one piece therewith, extends substantially from the bill of the hook to its shank and is provided with an arrow-head-shaped projection $d$, which in the locking position engages with the shank of the hook that has a swaged portion or notches $f$ on each side. On pressing inwardly the tongue $a$ one inclined surface of the projection $d$ slides past the shank of the hook, whereby the bar $c$ will first be deflected sidewise of the shank, and the projection will then engage with the notch $f$ of the shank, so as to hold the closing piece or tongue $a$ in the open position for enabling the loop or eye of the head or stud to be slipped on the hook, as shown in Figs. 3 and 4. On pressing with the finger upon the projection $d$ in the direction away from the shank of the hook it will be disengaged, and the tongue $a$ will then spring back into the closed position. Figs. 5, $5^a$, 6, and $6^a$ show a similar form of the projection $d$ on the bar $c$ of the spring-tongue $a$; but in this case the shank of the hook has a wedge-shaped projection or swaged portion $g$, directed toward the projection $d$, and which on pressing the closing piece inwardly causes the bar $c$ to be deflected laterally and slide off one or the other incline of the wedge $g$ until the projection $d$ springs into engagement with the under side of the shank.

Figs. 7, 7ª, 8, and 8ª show a construction similar to that last described applied to that kind of carbine-hooks in which the closing piece or tongue is not made in one piece with but is pivoted to the shank of the hook or to the stud or other attachment thereon and is held in closed position by a spring or other known device. In this construction instead of forming a wedge-shaped projection $g$, as in Figs. 5 and 6, projecting above the shank of the hook this has wedge-shaped inclines $h$ formed upon it that operate in the same manner as the projection $g$.

The locking-bar can also be made bifurcated or of a fork shape, as shown at Figs. 9, 9ª, 10, and 10ª, the two arms $c'$ of the fork having projections on the inner side, which on pressing the closing-piece inwardly engage with a prismatically-formed part $h'$ of the shank of the hook, so as to hold the closing piece or tongue both in the open and closed position. One of these arms, $c^2$, is somewhat shorter than the other, $c'$, and both have notches that engage and spring over the edges $h^2$ of the prismatic part $h'$ of the shank, and thereby hold the tongue away from the hook. A slight pull will by reason of the coöperating inclined surfaces release the tongue. The longer arm $c'$ has a second notch $c^4$, which when the tongue is in position to close the hook engages the prismatic portion $h'$ of the shank to lock the tongue in closed position.

In the construction shown at Figs. 11, 11ª, 12, and 12ª and also at Figs. 13, 13ª, 14, and 14ª the carbine-hook is split longitudinally or formed of two parts $i$, fitting close together with spring action, through a looped part of which the locking-bar $c$ passes. If this bar is subject to spring action, as at Figs. 11 and 12, it can be held in the depressed position of the closing-piece by forming the loop $k$ of the hook-shank with a central contraction, as shown at Fig. 12, so that on pressing the piece $a$ inwardly the bar $c$ will be made to pass from the one end of the loop past the contraction into the other end part, so as to be held thereby, or if the bar has no spring action, as at Figs. 13 and 14, it can be formed with notches, such as those at Figs. 1 to 8, behind its projection $d$, with which notches the two parts of the shank engage with spring action, so as to hold the part $a$ both in the open and in the closed position.

Figs. 15, 15ª, and 15ᵇ show a construction in which the bar $c$ is formed in one with or fixed to the shank of the hook, while the closing piece or tongue $a$ is split and formed with a loop $k'$ in a similar manner to the shank of the hook in Figs. 12 and 13, through which loop the bar $c$ passes when $a$ is pressed inwardly and is gripped by the spring action of the latter, so as to cause this to be held open.

Having thus described my said invention, what I claim as new therein, and desire to secure by Letters Patent, is—

1. The combination with a hook, of a closing spring-tongue for said hook, said tongue being extended to form means rigid therewith to engage the shank of the hook when deflected laterally and depressed to lock the tongue in open position, substantially as described.

2. The combination with a hook, of a closing spring-tongue for said hook, said tongue being extended to form means integral therewith to engage the shank of the hook when deflected laterally and depressed to lock the tongue in open and in closed positions, substantially as and for the purpose set forth.

3. The combination with a hook, of a closing spring-tongue for said hook integral therewith and means integral with the tongue, to engage the shank of the hook when deflected laterally and depressed to lock the tongue in open and closed position, substantially as and for the purpose set forth.

4. The combination with a hook having a shank provided with inclined faces, of a closing-tongue for said hook having a locking member integral therewith and provided with inclined faces to coöperate with those on the shank, and a notch also in said member to engage the shank laterally and lock the tongue in open position, said locking member held in engagement with the shank by the tongue, substantially as and for the purposes set forth.

5. A hook having a closing member and a shank member, and a bifurcated element rigidly secured to one of the members and engaging the other, whereby the closing member is locked in either open or closed position, substantially as described.

6. The combination with a hook, its shank and tongue, of a bifurcated locking member rigidly connected to the tongue adapted to embrace the shank and lock the tongue in both open and closed position, substantially as described.

7. The combination with a hook and its shank split longitudinally to form two similar pieces, of a tongue and a locking member adapted to engage the two pieces of the shank to lock the tongue in open position, substantially as described.

8. The combination with a hook and its shank having bevels formed on a portion of the latter, of a tongue and a locking member having coöperating bevels to flex the tongue to one side and notches to be engaged by the beveled portion of the shank, substantially as described.

9. The combination with a hook and its shank having a prismatic portion formed thereon, of a tongue and a bifurcated bar extending from the tongue and embracing the prismatic portion, said bar having oppositely-situated notches to be engaged by the prismatic portion to hold the tongue open, substantially as described.

10. The combination with a hook and its shank having a prismatic portion formed thereon, of a tongue and a bifurcated bar secured to the tongue and having a long and a short arm, the long arm having two notches and the short arm one notch opposite one of the notches in the long arm to coöperate with the prismatic portion to hold the tongue in both open and closed position, substantially as described.

11. The combination with a hook having a shank split longitudinally and an opening formed in it, of a tongue having a locking member integral therewith and adapted to pass through the opening in the split shank, substantially as described.

12. The combination with a hook, having a shank split longitudinally and a lateral depression in each portion of the shank oppositely situated to form an opening, of a tongue and a locking member rigidly secured thereto, said locking member passing through the opening and adapted to engage the shank, substantially as described.

13. The combination with a hook and its shank, of a tongue, means integral with the tongue to extend from the bill of the hook to its shank and having thereon upper and lower locking-faces adapted to engage the shank of the hook to lock the tongue in both open and in closed position, substantially as described.

In testimony that I claim the foregoing as my invention I have signed my name in presence of two subscribing witnesses.

SAMUEL ADLER.

Witnesses:
    JOSEF RUBARCH,
    ALVESTO S. HOGUE.